United States Patent [19]

Iketaki

[11] Patent Number: 5,022,064
[45] Date of Patent: Jun. 4, 1991

[54] X-RAY OPTICAL SYSTEM FORMED BY MULTILAYER REFLECTING MIRRORS FOR REFLECTING X-RAYS OF DIFFERENT WAVELENGTHS

[75] Inventor: Yoshinori Iketaki, Oume, Japan

[73] Assignee: Olympus Optical Co., Ltd., Tokyo, Japan

[21] Appl. No.: 474,152

[22] Filed: Feb. 2, 1990

[30] Foreign Application Priority Data

Feb. 10, 1989 [JP] Japan .................. 1-31932

[51] Int. Cl.$^5$ .................. G21K 1/00; G21K 7/00
[52] U.S. Cl. .................. 378/145; 378/43; 378/70; 378/84
[58] Field of Search .................. 378/84, 85, 145, 70, 378/43; 428/912.2

[56] References Cited

U.S. PATENT DOCUMENTS

| | | | |
|---|---|---|---|
| 2,843,751 | 7/1958 | Botty et al. | 378/43 |
| 4,317,043 | 2/1982 | Rosenbluth et al. | 378/70 |
| 4,675,889 | 6/1987 | Wood et al. | 378/84 |
| 4,684,565 | 8/1987 | Abeles et al. | 428/912.2 |
| 4,698,833 | 10/1987 | Keem et al. | 378/85 |
| 4,727,000 | 2/1988 | Ovshinsky et al. | 378/84 |

OTHER PUBLICATIONS

Spiller, Controlled Fabrication of Multilayer Soft-X-Ray Mirrors, 1981 American Institute of Physics, pp. 1048-1050.
"The Two-Mirror Aplanat", A. K. Head, Proc. Phys. Soc. 70, pp. 945-949.

*Primary Examiner*—Edward P. Westin
*Assistant Examiner*—Kim-Kwok Chu
*Attorney, Agent, or Firm*—Kenyon & Kenyon

[57] ABSTRACT

An optical system for X rays having a multilayer reflecting mirror which has high reflectances for X rays of different wavelengths. One type of multilayer reflecting mirror is such that the mirror surface of the multilayer reflecting mirror is divided into a plurality of regions, and the regions are provided with multilayers which are such that the reflectance of each multilayer is maximum for X rays of a corresponding wavelength. Another type of multilayer reflecting mirror has a substrate and a plurality of multilayer laid on the substrate, wherein the wavelength of X rays to be reflected with a maximum reflectance varies from multilayer to multilayer. The optical system for X rays according to the present invention is a focusing optical system having a plurality of such multilayer reflecting mirrors and can obtain object images by using X rays of a plurality of wavelengths.

17 Claims, 11 Drawing Sheets

FIG.1
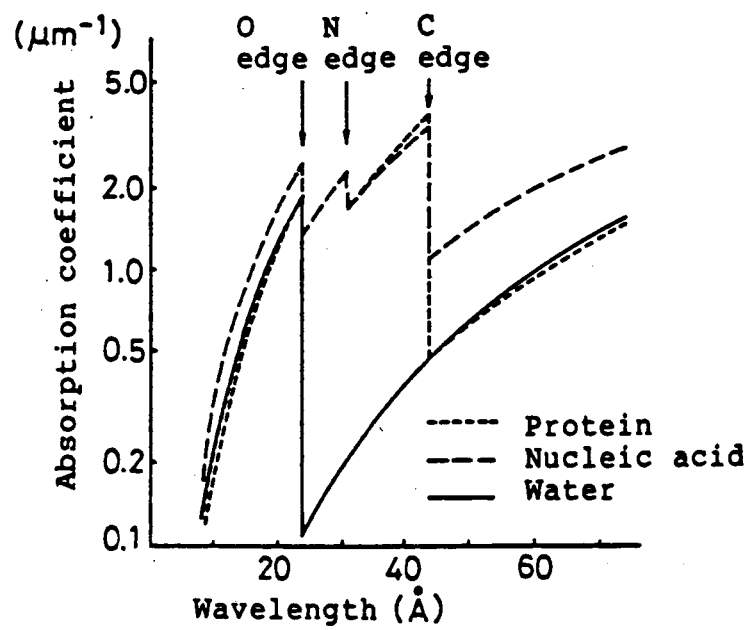
FIG.2(a)    FIG.2(b)
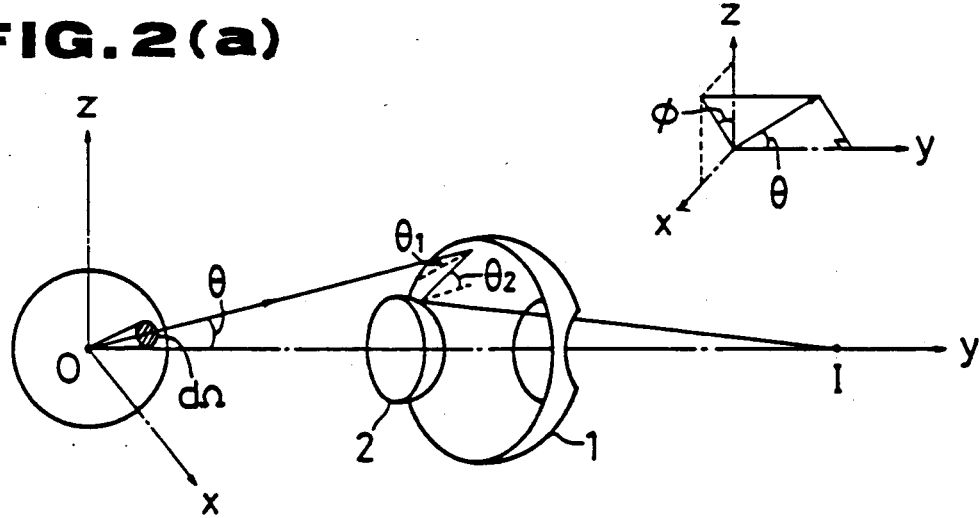

X-RAY OPTICAL SYSTEM FORMED BY MULTILAYER REFLECTING MIRRORS FOR REFLECTING X-RAYS OF DIFFERENT WAVELENGTHS

BACKGROUND OF THE INVENTION

1. Field of the Invention

This invention relates to an optical system for X rays and a multilayer mirror used therefor.

2. Description of Related Art

The recent development of technology for applying X rays to an object and obtaining an image of the object by the X rays transmitted through the object has been applied for industrial tests, biological analysis, etc. Particularly in the fields where microscopic images by X rays are necessary, there is a great demand for producing a microscopic image of a specific chemical element by transmitted X rays and X-ray luminescence from a specimen.

The reason why a transmission image of only a specific element can be obtained by X rays is that the absorption coefficients of elements have different wavelength dependence in the X-ray wavelength range. FIG. 1 shows how protein, nucleic acid and water absorb X rays, with wavelengths and absorption coefficients represented on the horizontal and vertical axes, respectively. In the figure, the O, N and C edges are the absorption edges of X rays by oxygen, nitrogen and carbon, respectively. As is apparent from the figure, each element has its specific discontinuous absorption edge: for example, carbon has a discontinuous absorption edge at about 44Å, and nitrogen at about 31Å. Therefore, when a transmission image of protein is obtained by X rays of a wavelength in the neighborhood of the absorption edge where the absorption coefficient is maximum, for example, X rays of a wavelength of about 40Å, one can expect a high-contrast good image showing the distribution of carbon in protein. Furthermore, if one makes use of the difference between a transmission image obtained by X rays of a wavelength slightly shorter than that of the absorption edge of an element to be detected, at which wavelength the absorption coefficient is high, and a transmission image obtained by X rays of a wavelength slightly longer than that of the absorption edge, at which wavelength the absorption coefficient is low, then one can obtain a better image even if the X rays are weak. This is because the use of the difference can eliminate unnecessary signals resulting from the absorption by elements other than the element to be detected. Such a method is achieving success in medical radiography using sychrotron radiation and the like fields.

On the other hand, owing to the recent progress of manufacturing technology, various optical devices for X rays have been developed for commercial use and applied for the imaging optical systems of X-ray microscopes. In particular, attention is recently drawn to a Schwarzschild optical system comprising a concave mirror and a convex mirror each having a multilayer formed on a substrate since it has a better imaging performance than other X-ray optical systems (for example, Walter type optical system). It has been proposed to apply this optical system for the imaging optical system of a microscope or an exposing apparatus for semiconductor manufacturing in which a high imaging performance is required. If the above-mentioned method can be also applied to the Schwarzschild optical system, an attractive microscope system can be realized.

A Schwarzschild optical system as an optical system for X rays, the perspective view of which is shown in FIG. 2, is a focusing optical system in which a concave mirror 1 having a circular opening in its center and a convex mirror 2 are arranged coaxially with their reflecting surfaces opposed to each other and which focuses X rays radiated from an object point O at an image point I through the opening of the concave mirror 1 via the two reflecting mirrors. In order to reflect the X rays radiated from the object point O with a high reflectance to focus them at the image point I, each of the two spherical mirrors 1 and 2 comprises a substrate and a uniform multilayer formed on the substrate by laying alternately two kinds of substances whose refractive indexes are much different from each other.

The multilayer has such a structure as shown in FIG. 3: a layer of substance a having a thickness of $d_1$ and a layer of substance b having a thickness of $d_2$ are laid on a substrate 3 alternately and repeatedly with a periodic thickness of d. With this multilayer, a high reflectance can be obtained under Bragg's condition, that is, $$m\lambda = 2d \sin \omega$$

where $\lambda$ is the wavelength of X rays, d is the periodic thickness of the multilayer, $\omega$ is the grazing angle of X rays with respect to the multilayer, and m is an integer. Especially, X rays of a wavelength defined by the following formula are efficiently reflected:

$$\lambda = 2d \sin \omega \text{ (that is, } m=1\text{)}.$$

Additionally, in FIG. 3, numerals 4 and 5 represent incident X rays and reflected X rays, respectively, and $\theta$ denotes the incident angle.

Thus, in FIG. 2, only when X rays having a specific wavelength are incident on the spherical mirrors 1 and 2 at a specific incident angle, they are efficiently reflected. Particularly in the Schwarzschild optical system, since the grazing angle $\omega$ is about 90°, only the X rays of a wavelength of $\lambda = 2d$ are focused. So, it is very difficult to focus X rays of two different wavelengths at the same time. Therefore, although it has been also expected in the Schwarzschild optical system to use the difference between the transmission images obtained by X rays of two wavelengths which are on both sides of the absorption edge of an element, the application of this method has been difficult because of the above reason.

SUMMARY OF THE INVENTION

An object of the present invention is to provide an optical system for X rays which can be used for X rays of different wavelengths.

Another object of the invention is to provide an optical system for X rays which can form images by X rays of different wavelengths.

A further object of the invention is to provide a Schwarzschild optical system utilizing multilayer reflecting mirrors which reflect X rays of different wavelengths.

A still further object of the invention is to provide an optical system for X rays which can form object images by X rays of wavelengths shorter and longer than the wavelength of the absorption edge of an specific element.

A still further object of the invention is to provide a multilayer reflecting mirror which efficiently reflects X rays of different wavelengths.

An optical system for X rays according to the present invention includes a multilayer reflecting mirror which has high reflectances for X rays of different wavelengths.

According to a preferred formation of the present invention, the mirror surface of the multilayer reflecting mirror is divided into a plurality of regions, and the regions are provided with multilayers which are such that the reflectance of each multilayer is maximum for X rays of a corresponding wavelength. Further, the optical system for X rays includes a plurality of such multilayer reflecting mirrors, and the wavelengths of X rays to be reflected with maximum reflectances are common to all the reflecting mirrors. The reflecting mirrors are arranged in such a manner that X rays reflected by the region of one multilayer reflecting mirror where the reflectance for a wavelength is maximum are incident on the region of the other multilayer reflecting mirror where the reflectance for the same wavelength is maximum.

According to another preferred formation of the invention, the multilayer reflecting mirror comprises a substrate and a plurality of multilayers laid on the substrate, and the wavelength of X rays to be reflected with a maximum reflectance varies from multilayer to multilayer. Further, in order to prevent X rays of a plurality of wavelengths from being reflected by the multilayer reflecting mirror so that the reflected rays may not be overlapped, the optical system is provided with a dispersing means for dispersing the rays entering or exiting from the optical system.

According to a further preferred formation of the invention, the optical system for X rays is a Schwarzschild optical system in which a concave mirror having an opening in its center is opposed to a convex mirror and which focuses in a predetermined image plane X rays emitted from a ray source. The wavelengths of the X rays are selected to be slightly shorter and slightly longer than the wavelength of the absorption edge of a specific element, and an image of an object including this element can be obtained by the X rays of these wavelengths.

These and other objects as well as the features and advantages of the present invention will become apparent from the following detailed description with the preferred embodiments when taken in conjunction with accompanying drawings and appended claims.

BRIEF DESCRIPTION OF THE DRAWINGS

FIG. 1 is a graph showing the dependence of the absorption coefficients of elements on the wavelengths of X rays.

FIG. 2 is an illustration of a Schwarzschild optical system.

DETAILED DESCRIPTION OF THE PREFERRED EMBODIMENTS

As described above, in order to obtain a transmission image of an element contained in a specimen by means of an X-ray microscope system using a Schwarzschild optical system, it is preferable to obtain transmission images by X rays of two wavelengths shorter and longer than the wavelength of the absorption edge of the element and to take the difference of them. For that purpose, the following two problems must be solved: I. The Schwarzschild optical system must be able to focus X rays of a plurality of wavelengths. II. If the ray source is a white ray source, X rays need to be dispersed in order that transmission images by respective wavelength components of the X rays can be separately obtained.

The solution of the above two problems will be described below.

I. Methods of Enabling the Schwarzschild Optical System to Focus X Rays of a Plurality of Wavelengths (1) Forming different kinds of multilayers on a plurality of regions of the reflecting surface of the multilayer reflection mirror.

Each mirror surface of the concave mirror and the convex mirror is divided into a plurality of regions, and the regions are provided with respective multilayers which are designed (hereinafter referred to as "adapted") in such a manner that when X rays of a specific wavelength are incident on a corresponding multilayer at a specific incident angle, they are reflected with a maximum reflectance.

FIG. 4 shows a Schwarzschild optical system in which a concave mirror 1 having a circular opening in its center is opposed to a convex mirror 2; FIGS. 4(a), 4(c) and 4(d) are perspective views, and FIG. 4(b) shows the elevations of the reflecting surfaces of the reflecting mirrors.

Figure 5A:
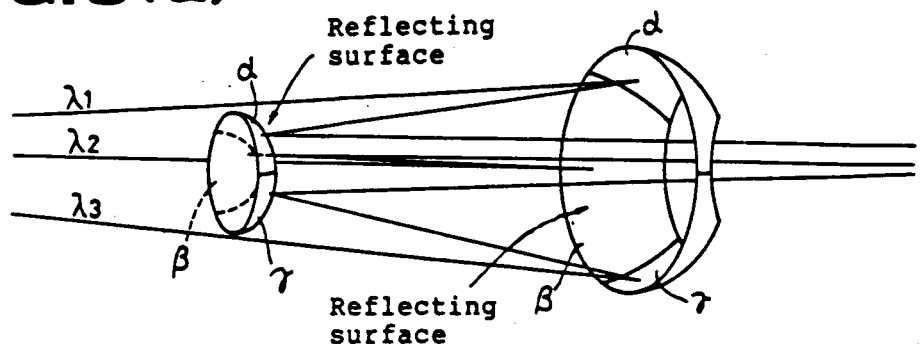
Figure 5B:
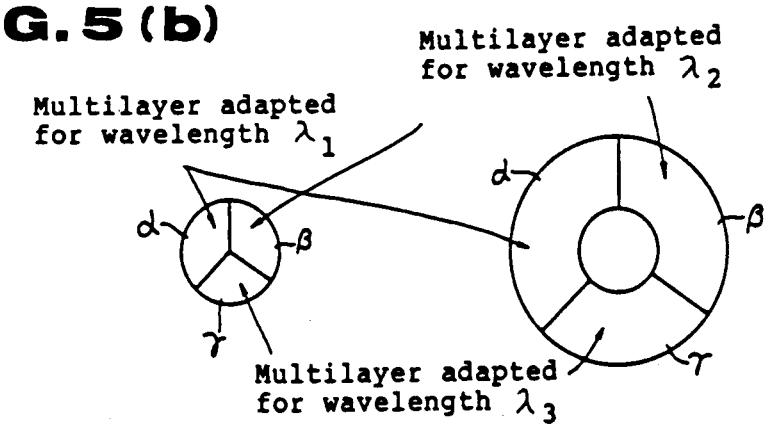

In the figure, each reflecting surface of the concave and convex mirrors 1 and 2 of the Schwarzschild optical system is divided into two regions $\alpha$ and $\beta$ the borderline of which is a diameter of the reflecting surface. A multilayer adapted for X rays of wavelength $\lambda_1$ is formed in region $\alpha$, and a multilayer adapted for X rays of wavelength $\lambda_2$ is formed in region $\beta$. The rays reflected by region $\alpha$ of the concave mirror 1 impinge on region $\alpha$ of the convex mirror 2, and the rays reflected by region $\beta$ of the concave mirror 1 are incident on region $\beta$ of the convex mirror 2. Such a Schwarzschild optical system focuses the X rays of wavelength $\lambda_1$ by regions $\alpha$ of the mirrors 1 and 2 and the X rays of wavelength $\lambda_2$ by regions $\beta$. Similarly, as shown in FIGS. 5(a) and 5(b), if each reflecting surface of the mirrors 1 and 2 is divided into three regions $\alpha$, $\beta$ and $\gamma$, and multilayers adapted for X rays of wavelengths $\lambda_1$, $\lambda_2$ and $\lambda_3$, respectively are formed in the respective regions, then a Schwarzschild optical system capable of focusing X rays of these three wavelength can be obtained.

Figure 6A:
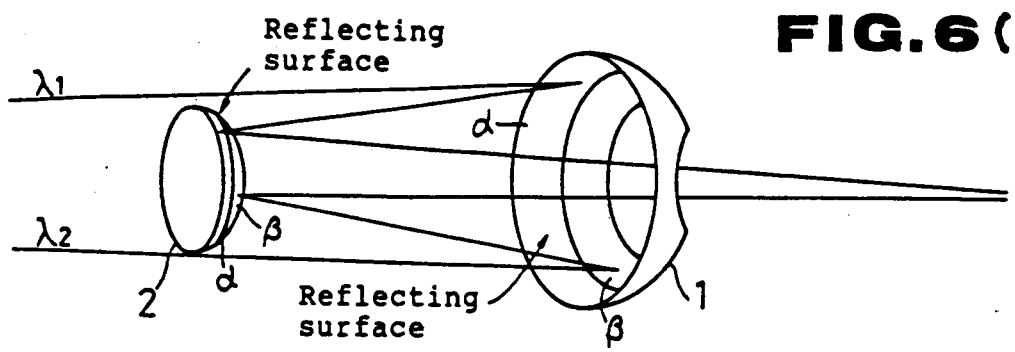
Figure 6B:
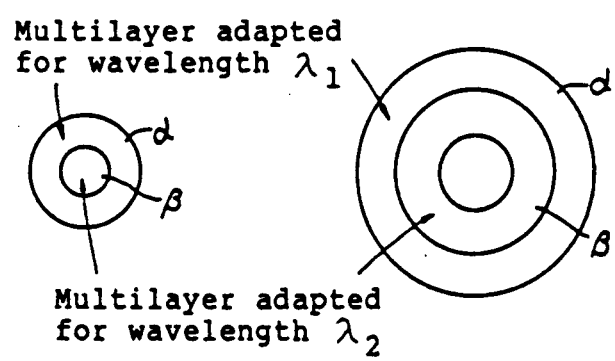

Another method of dividing the reflecting surfaces of the reflecting mirrors 1 and 2 are shown in FIGS. 6(a) and 6(b). Each reflecting surface is divided into outer and inner regions $\alpha$ and $\beta$ the borderline of which is a circle with its center being on the optical axis.

Figure 3:
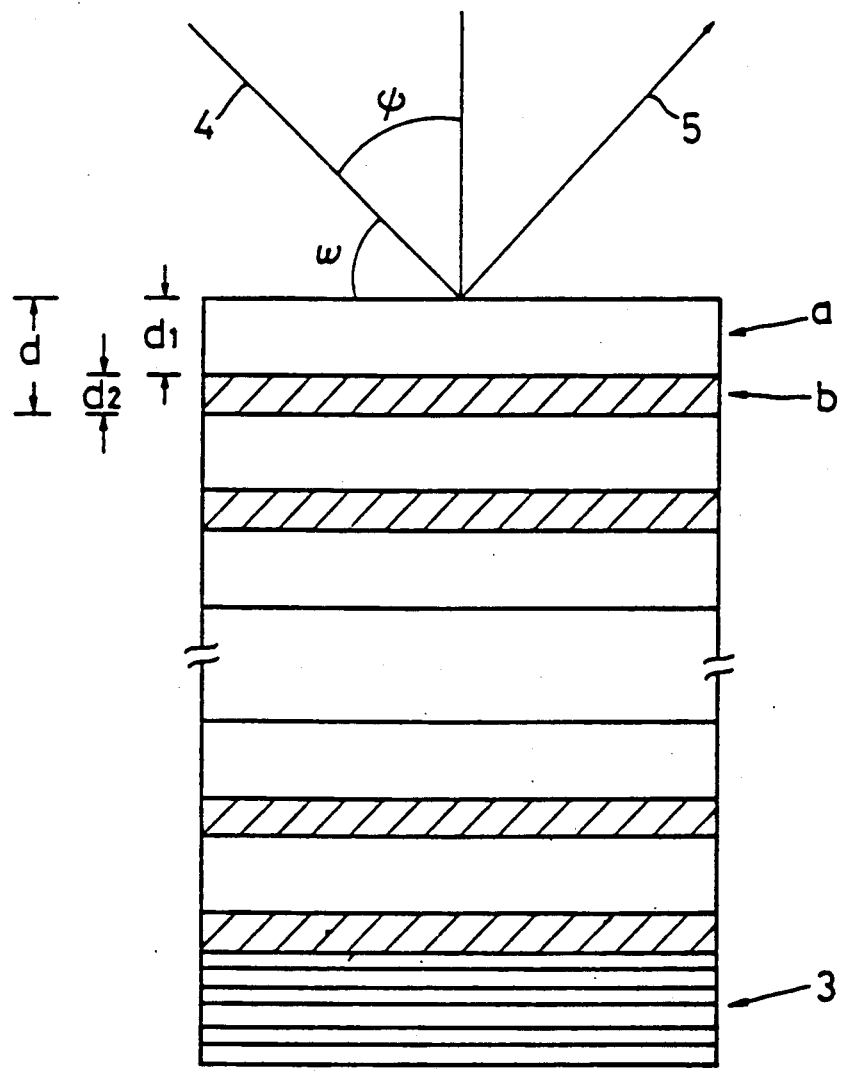
FIG. 3 is a schematic cross-sectional view of a multilayer reflecting mirror.
Figure 4A:
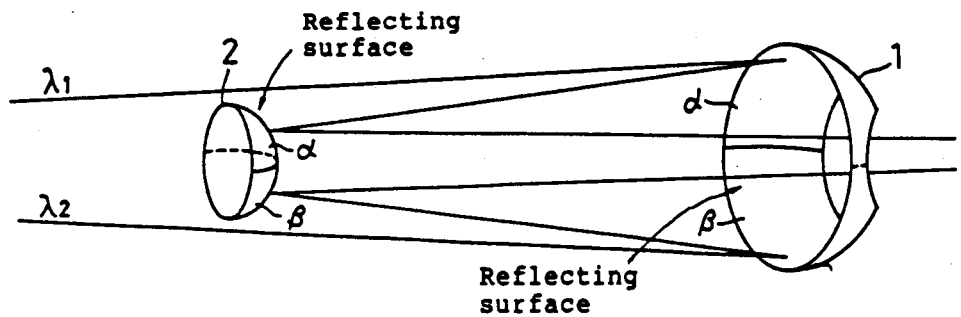
FIGS. 4, 5 and 6 are illustrations of Schwarzschild optical systems according to the present invention, in which the reflecting surfaces of multilayer reflecting mirrors are divided into a plurality of regions.

In these methods, it is necessary that the X rays reflected by a region of the concave mirror 1, where a multilayer adapted for X rays of a certain wavelength is formed, be incident on and reflected by the region of the convex mirror 2 where a multilayer adapted for the X rays is formed. The structures shown in FIGS. 4, 5 and 6 satisfy this requirement in that the X rays of wavelength $\lambda_1$ are reflected by regions $\alpha$ of the concave and convex mirrors and the X rays of wavelength $\lambda_2$ are reflected by regions $\beta$, as shown in FIGS. 4(a), 5(a) and 6(a).

The above-described methods can provide Schwarzschild optical systems capable of focusing X rays of a plurality of wavelengths.

(2) Laying different kinds of multilayers on a substrate to form a multilayer reflecting mirror Although the design methods and characteristics of multilayers for visible radiation and X rays are basically the same, the multilayer reflecting mirror has the characteristic that the transmissivity of X rays is very high. The use of this characteristic makes it possible to design a multilayer reflecting mirror having high reflectances for X rays of a plurality of wavelengths by laying a plurality of multilayers each adapted for the X rays having a corresponding wavelength.

Figure 7:
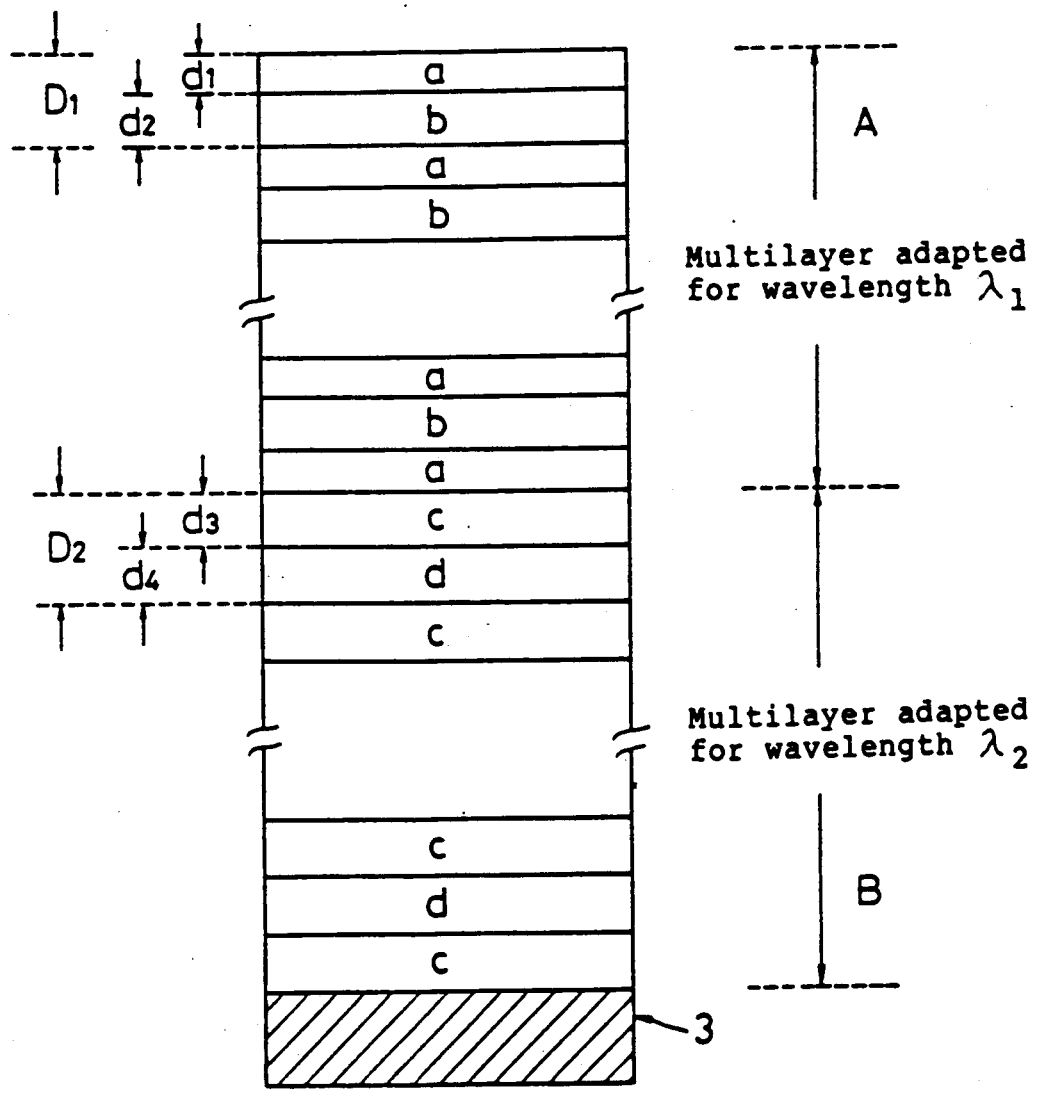
FIG. 7 is a schematic cross-sectional view of a multilayer reflecting mirror according to the present invention, which has high reflectances for X rays of two wavelengths.

FIG. 7 shows a concept of a multilayer reflecting mirror having high reflectances for X rays of two wavelengths. The multilayer of part A is formed in such a manner that a layer of substance a having a thickness of $d_1$ and a layer of substance b having a thickness of $d_2$ are laid alternately and repeatedly with a periodic thickness of $D_1$. The multilayer of part B is formed in such a manner that a layer of substance c having a thickness of $d_3$ and a layer of substance d having a thickness of $d_4$ are laid alternately and repeatedly with a periodic thickness of $D_2$. Both multilayers are laid on a substrate 3. Part A is designed to have a maximum reflectance for X rays of wavelength $\lambda_1$ incident at a specific grazing angle $\omega_1$ in accordance with Bragg's condition. Similarly, part B is designed to have a maximum reflectance for X rays of wavelength $\lambda_2$ incident at a grazing angle $\omega_2$. According to this concept, a multilayer reflecting mirror usable for X rays of three wavelengths can be obtained by laying a further multilayer designed to have a maximum reflectance for X rays of a different wavelength. Thus, a multilayer reflecting mirror usable for X rays of a plurality of wavelengths can be made by laying multilayers each adapted for X rays of a corresponding wavelength. The multilayer reflecting mirror can efficiently reflect X rays of each wavelength if it is designed in such a manner that the lower the transmissivity of a multilayer is, the nearer to the substrate the multilayer is, and that the higher the transmissivity of a multilayer is, the nearer to the plane of incidence of X rays the multilayer is.

II. Methods of Separately Obtaining Transmission Images by Respective Wavelength Components of X Rays Such X-ray sources as a synchrotron apparatus, laser plasma and an X-ray tube are white ray sources. In order to make a difference image by X rays of two wavelengths on both sides of the absorption edge of an element to be detected, it is preferable that X rays of necessary wavelengths be selected from white rays to make transmission images. This is because when the above-described Schwarzschild optical system adapted for X rays of a plurality of wavelengths is used to take a transmission image with white rays, the image will be a superimposition of the transmission images by X rays of each wavelength which can be focused by the Schwarzschild optical system. Therefore, it is necessary to decompose the superimposition into individual images by X rays of each wavelength. Moreover, it is preferable that identical transmission images be taken by the X rays of selected wavelengths without changing basically the positions of the object point, Schwarzschild optical system and image point.

Mainly, there are three ways to realize the above: (1) inserting in the Schwarzschild optical system a stop with its opening changeable, (2) dispersing X rays from the ray source so that X rays of each wavelength are separately incident on the Schwarzschild optical system, and (3) dispersing X rays immediately before the detectors so that X rays of each wavelength are separately detected by the respective detectors.

(1) Inserting in the Schwarzschild optical system a stop with its opening changeable.

In the case of the Schwarzschild optical system of the type described in I(1) above, transmission images by respective wavelength components of X rays can be separately obtained by inserting in the optical system a stop with its opening changeable, without using a special dispersing device or the like. That is, in order to pick up a transmission image by one of the wavelength components of X rays which can be focused by the optical system, the ray blocking portion of the stop is used to shut off the rays to be incident on other region of the mirror surface than the region having a multilayer adapted for the wavelength. In this case, even if white rays enter the optical system, the multilayer on the region which is not shaded by the stop, that is, corresponds to the opening, can produce an image by X rays of a wavelength satisfying Bragg's condition. When the opening of the stop is changed over, an image by X rays of another wavelength can be obtained.

(2) Dispersing X rays from the ray source so that X rays of each wavelength are separately incident on the Schwarzschild optical system.

In the case of the Schwarzschild optical system of the type described in I(2) above, the method of inserting a stop in the optical system as described in II(1) above cannot be used. Instead, white rays radiated from the ray source are dispersed to be separately introduced into the Schwarzschild optical system. Dispersing devices such as a diffraction grating, for example, a monochromator of the Seya-Namioka type, are necessary. However, this method can be applied for the Schwarzschild optical system of the type described in I(1) above, thus it has a wide range of application.

(3) Dispersing X rays immediately before the detectors so that X rays of each wavelength are separately detected by the respective detectors.

In the case of the Schwarzschild optical system of the type described in I(2) above, it is also effective to arrange a dispersing device immediately before the detectors to disperse X rays passing through the optical system so that X rays of each wavelength are separately detected by the respective detectors. This method also can be applied for the Schwarzschild optical system of the type described in I(1) above.

Next, the present invention will be described in more detail.

EXAMPLE 1

Figure 8A:
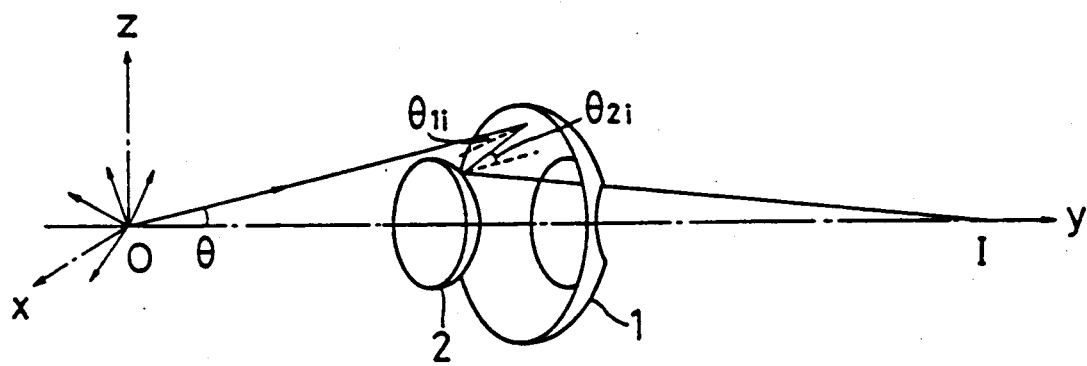
FIG. 8 is a diagram showing fundamental parameters of a Schwarzschild optical system.
Figure 8B:
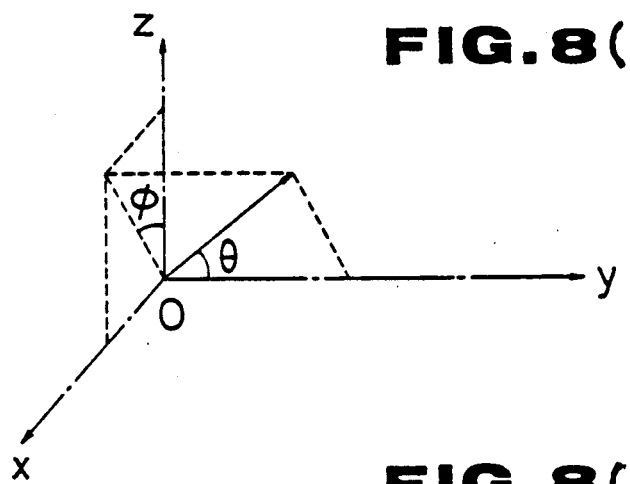
Figure 8C:
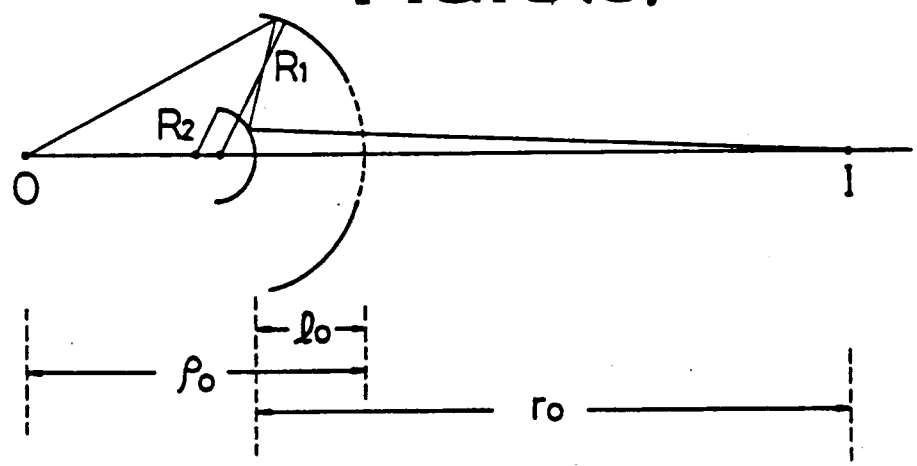

FIG. 8 shows a structure of a Schwarzschild optical system, and its fundamental parameters. FIG. 8(a) is a perspective view of the Schwarzschild optical system, FIG. 8(b) shows a coordinate system with its origin located at an object point O, and FIG. 8(c) is a sectional view of the Schwarzschild optical system along its optical axis (y-axis). $\theta_{1i}$ is the incident angle of X rays to a concave mirror 1, $\theta_{2i}$ is the incident angle of X rays to a convex mirror 2, $R_1$ and $R_2$ are the radii of curvature of the concave mirror 1 and the convex mirror 2, respectively, $\rho_0$ is the distance from the object point O to the concave mirror 1 along the optical axis, $l_0$ is the distance from the concave mirror 1 to the convex mirror 2 along the optical axis, and $r_0$ is the distance from the convex mirror 2 to an image point I along the optical axis.

The conditions for the Schwarzschild optical system being free from aberration were obtained by A. K. Head (Proc. Phys. Soc. 70,945 (1957)). That is, using the symbols of FIG. 8:

$$R_1 = 2ml_0\rho_0/(m\rho_0 + ml_0 - r_0)$$

$$R_2 = 2l_0r_0/(r_0 + l_0 - m\rho_0)$$

where m is the magnification of the Schwarzschild optical system. As an example, let us consider an optical system of m=100 with the radius of curvature of the convex mirror 2 being $R_2 = 1$, which has the following values:

$r_0 = 78.2$,
$\rho_0 = 3.48$,
$l_0 = 1.67$,
$R_1 = 2.67$,
$R_2 = 1$

Let $f_1(\theta_{1i})$ be the reflectance when X rays are incident on the concave mirror 1 at an incident angle $\theta_{1i}$, and let $f_2(\theta_{2i})$ be the reflectance when the X rays reflected by the concave mirror 1 are incident on the convex mirror 2 at an incident angle $\theta_{2i}$. The brightness of the X rays radiated from the object point O and focused at the image point I is proportional to the value $\Gamma$ given by the following formula:

$$\Gamma = \int_\Sigma f_1(\theta_{1i}) f_2(\theta_{2i}) d\Omega(\theta,\phi) \quad (1)$$

where $\Omega(\theta,\phi)$ is the solid angle of the pencil of X rays radiated from the object point O to the Schwarzschild optical system, and the range $\Sigma$ of integration is the solid angle of the pencil of X rays which can really pass through the effective aperture. The reflectances $f_1(\theta_{1i})$ and $f_2(\theta 2i)$ of the multilayer reflecting mirrors have such angle dependence that they are maximum when the X rays of a specific wavelength are incident at specific incident angles. In general, X rays are incident on the surface of the reflecting mirror of the Schwarzschild optical system at various angles. Therefore, it is necessary to design the multilayer so that the value $\Gamma$ of equation (1) can be maximum.

For example, in the case of the Schwarzschild optical system having the structure of FIG. 8, the following examples of multilayers can be designed by using equation (1) for the X rays of wavelengths (1) $\lambda = 44.7$ Å, (2) $\lambda = 39.8$ Å, and (3) $\lambda = 31.6$ Å:

(1) $\lambda = 44.7$ Å

For the concave mirror 1:

A multilayer in which an Re layer having a thickness of 6.28 Å and a C layer having a thickness of 16.15 Å are laid alternately and which has a maximum reflectance when the incident angle $\theta_{1i}$ is 2.8°.

For the convex mirror 2:

A multilayer in which an Re layer having a thickness of 6.33 Å and a C layer having a thickness of 16.28 Å are laid alternately and which has a maximum reflectance when the incident angle $\theta_{2i}$ is 7.8°.

(2) $\lambda = 39.8$ Å

For the concave mirror 1:

A multilayer in which an Ni layer having a thickness of 8.01 Å and an Sc layer having a thickness of 12.02 Å are laid alternately and which has a maximum reflectance when the incident angle $\theta_{1i}$ is 2.8°.

For the convex mirror 2:

A multilayer in which an Ni layer having a thickness of 8.28 Å and an Sc layer having a thickness of 11.91 Å are laid alternately and which has a maximum reflectance when the incident angle $\theta_{2i}$ is 7.8°.

(3) $\lambda = 31.6$ Å

For the concave mirror 1:

A multilayer in which an Ni layer having a thickness of 6.82 Å and an Sc layer having a thickness of 9.04 Å are laid alternately and which has a maximum reflectance when the incident angle $\theta_{1i}$ is 2.8°.

For the convex mirror 2:

A multilayer in which an Ni layer having a thickness of 6.87 Å and an Sc layer having a thickness of 9.11 Å are laid alternately and which has a maximum reflectance when the incident angle $\theta_{2i}$ is 7.8°.

When such multilayers are used, difference images for the elements C and Ca by using their absorption edges can be obtained as described below even if the ray source is a white source.

First, it is explained how to obtain transmission images for C.

FIG. 1 shows that the absorption edge is at 43.68 Å. Therefore, when a multilayer reflecting mirror adapted for (1) $\lambda = 44.7$ Å and a multilayer reflecting mirror adapted for (2) $\lambda = 39.8$ Å are used, it is possible to obtain two transmission images by X rays of two wavelengths which are on both sides of the absorption edge of C, 43.68 Å, and to make an image of difference between the two images. As an example, each of the mirror surfaces of the Schwarzschild optical system is divided into a plurality of regions, and a multilayer adapted for (1) $\lambda = 44.7$ Å and a multilayer adapted for (2) $\lambda = 39.8$ Å are formed in the respective regions.

Figure 4B:
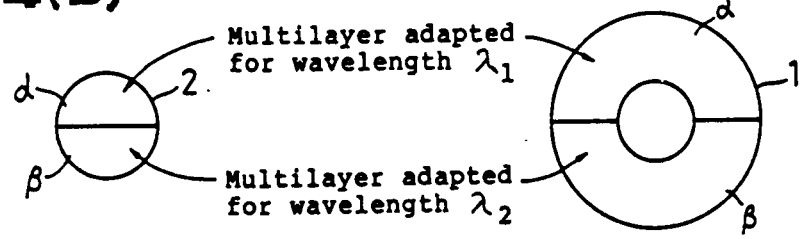

That is, as shown in FIGS. 4(a) and 4(b), each of the surfaces of the concave mirror 1 and the convex mirror 2 of the Schwarzschild optical system is divided into regions $\alpha$ and $\beta$ the borderline of which are its diameter, and a multilayer adapted for (1) $\lambda = 44.7$ Å and a multilayer adapted for (2) $\lambda = 39.8$ Å are formed in regions $\lambda$ and $\beta$, respectively.

Figure 4C:
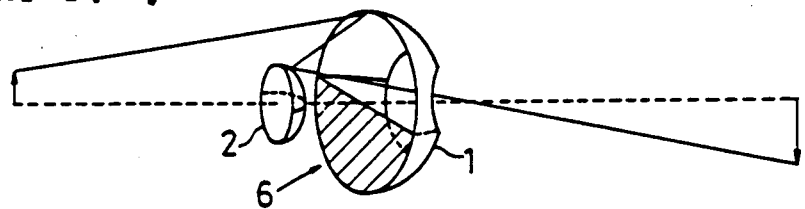

When an enlarged transmission image is taken by the X rays of a wavelength of 44.7 Å, the X rays to be incident on region $\beta$ are shut off by a semicircular ray-blocking plate (stop) 6 arranged just before the concave mirror 1, as shown in FIG. 4(c), and only the X rays of a wavelength of 44.7 Å are focused via region α to obtain an enlarged image by these X rays.

Figure 4D:
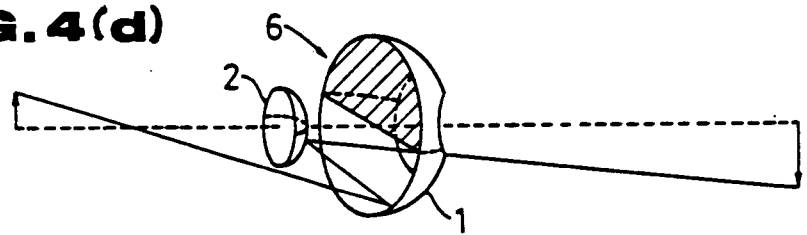

On the other hand, when an enlarged transmission image is taken by the X rays of a wavelength of 39.8 Å, the X rays to be incident on region α are shut off by rotating the semicircular ray-blocking plate 6 around the optical axis by 180°, as shown in FIG. 4(d), and only the X rays of a wavelength of 39.8 Å are focused via region β to obtain an enlarged image by these X rays.

As an example of the method of making an image of difference between the two enlarged transmission images obtained by the X rays of wavelengths of 44.7 Å and 39.8 Å, there is an easy method that a detector 11 of the photoelectric transducer type such as a microchannel plate is used to detect the enlarged transmission images and transduce them into electric signals which are subsequently subjected to an electrical arithmetic operation.

Figure 6C:
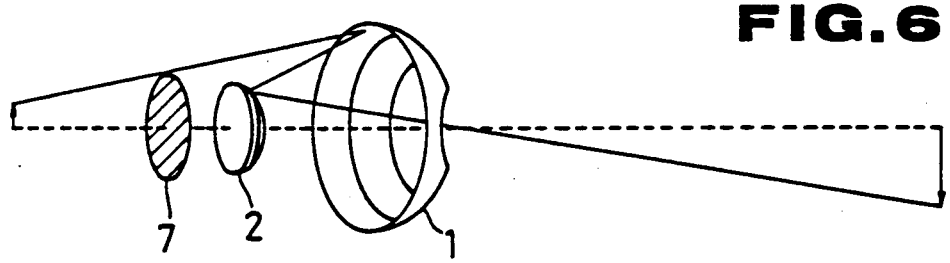
Figure 6D:
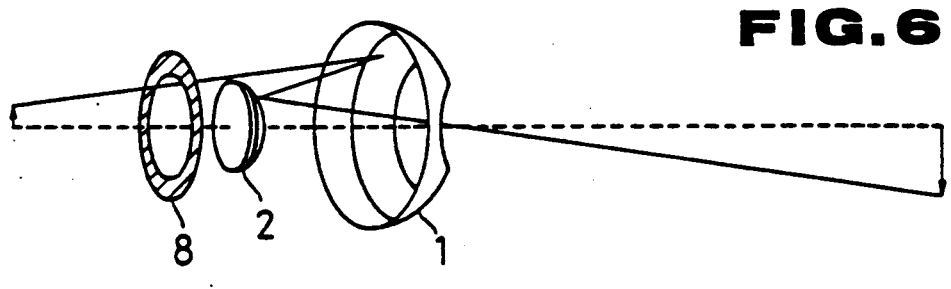

As another example of dividing the mirror surfaces of the Schwarzschild optical system, the method shown in FIGS. 6(a) and 6(b) of dividing each reflecting surface of the concave mirror 1 and the convex mirror 2 into annular regions α and β is also effective. For example, a multilayer adapted for (1) $\lambda=44.7$ Å and a multilayer adapted for (2) $\lambda=39.8$ Å may be formed in regions α and β, respectively. In this case, in order to take separately an image by the X rays of a wavelength of 44.7 Å and an image by the X rays of a wavelength of 39.8 Å, it is necessary to provide the optical system with a stop. As shown in FIGS. 6(c) and 6(d), circular and annular stops (ray blocking plate) 7 and 8 are alternately inserted between the object point O and the convex mirror 2. The circular stop 7 shuts off the X rays to be incident on region β, and the annular stop 8 blocks the X rays to be incident on region α. The stops 7 and 8 may be positioned between the concave and convex mirrors 1 and 2. With these methods, it is possible to make a difference image for C.

Further, Ca has its absorption edge at 35.12 Å. By using three kinds of multilayers adapted for (1) $\lambda=44.7$ Å, (2) $\lambda=39.8$ Å and (3) $\lambda=31.8$ Å, it is possible to realize a Schwarzschild optical system for taking transmission images for C and Ca.

Figure 5C:
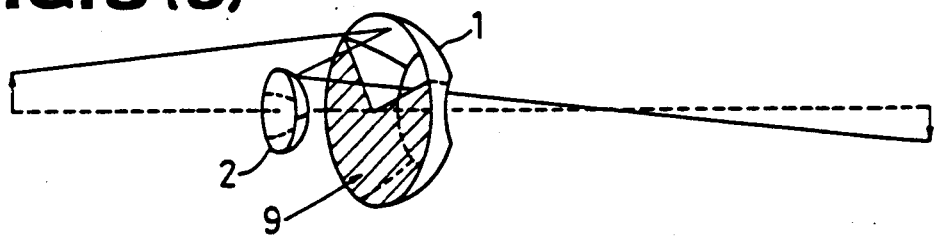

That is, since the absorption edge of C is between 44.7 Å and 39.8 Å and the absorption edge of Ca is between 39.8 Å and 31.8 Å, each of the mirror surfaces of the Schwarzschild optical system is divided into three regions α, β and γ, as shown in FIGS. 5(a) and 5(b), and multilayers adapted for (1) $\lambda=44.7$ Å, (2) $\lambda=39.8$ Å and (3) $\lambda=31.8$ Å are formed in regions α, β and γ, respectively. With such a Schwarzschild optical system, it is possible to make difference images for C and Ca in the same way as described above. As shown in FIG. 5(c), in order to take separate transmission images for respective wavelengths, a ray blocking plate (stop) 9 for allowing X rays to impinge on only one of regions α, β and γ are arranged between the concave and convex mirrors 1 and 2. The ray blocking plate 9 has a fan-shaped window and is rotated to pass the rays to a necessary regions. The principle of this example can be applied for taking an image by X rays of more than three wavelengths.

EXAMPLE 2

Next, it is explained how to make enlarged transmission images for Ca and C by using another kind of multilayer reflecting mirror which has high reflectance for X rays of a plurality of wavelengths and is designed by laying multilayers adapted for respective wavelengths of X rays.

Figure 9A:
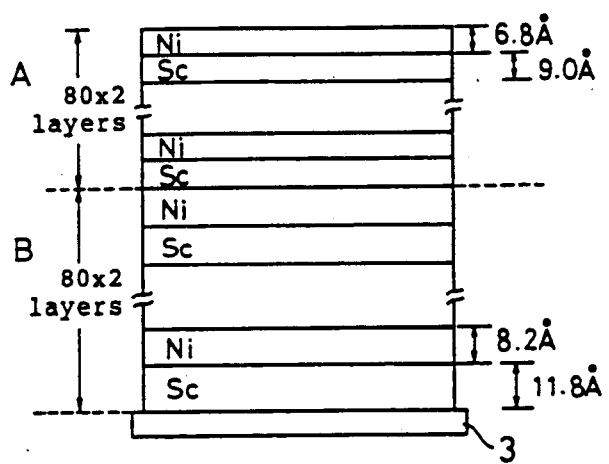
FIGS. 9(a) and 10(a) are schematic cross-sectional views of examples of the multilayer reflecting mirror shown in FIG. 7.
Figure 9C:
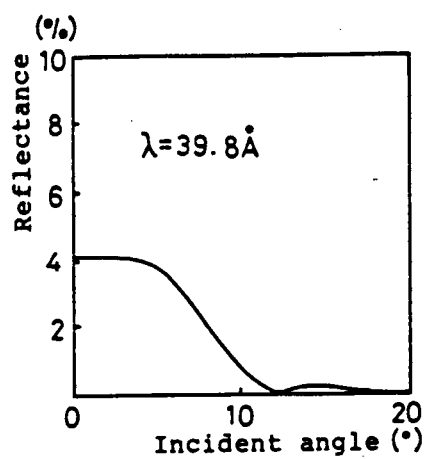
FIGS. 9(b), 9(c), 10(b) and 10(c) are graphs showing reflectances of the mirrors.
Figure 9B:
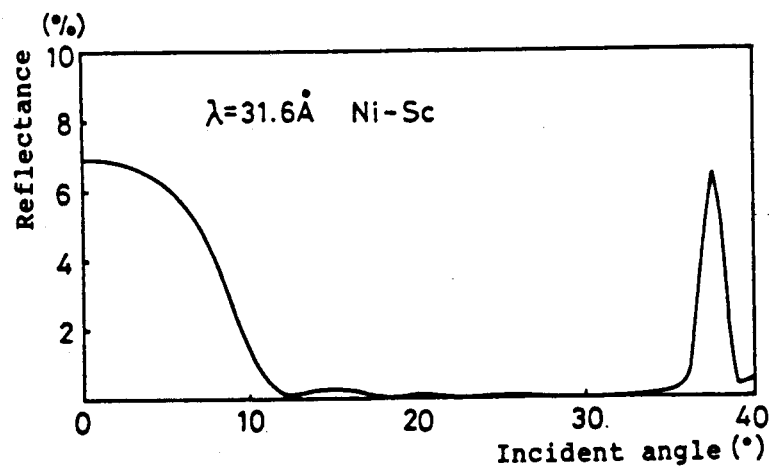

FIG. 9 shows a fist example of the multilayer reflecting mirror. The multilayer reflecting mirror is for Ca detection and has high reflectances for the X rays of two wavelengths $\lambda_1=31.6$ Å and $\lambda_2=39.8$ Å which are vertically incident. As shown in FIG. 9(a), the multilayer reflecting mirror comprises part A in which 80 couples of an Ni layer having a thickness of 6.8 Å and an Sc layer having a thickness of 9.0 Å are laid on the side of the incident surface, and part B in which 80 couples of an Ni layer having a thickness of 8.2 Å and an Sc layer having a thickness of 11.8 Å on the side of the substrate 3. FIGS. 9(b) and 9(c) shows the angle dependence of the reflectance of this multilayer for the X rays of wavelengths of 31.6 Å and 39.8 Å, respectively. The peak value of the reflectance is 7% for the X rays of $\lambda=31.6$ Å and 4% for the X rays of $\lambda=39.8$ Å. The total thickness of part A is 1264 Å, and the imaginary part (absorption coefficient) of its complex refractive index is 0.002 for the X rays of a wavelength of 39.8 Å and 0.0013 for the X rays of a wavelength of 31.6 Å. The total thickness of part B is 1600 Å, and the imaginary part of its complex refractive index is 0.002 for the X rays of a wavelength of 39.8 Å and 0.0013 for the X rays of a wavelength of 31.6 Å. So, multilayer A is thicker than multilayer B while the imaginary parts of the complex refractive indexes of multilayers A and B are almost the same. Thus, since the transmissivity of part A is higher than that of part B, part A is arranged on the side of the incident surface.

Figure 10:
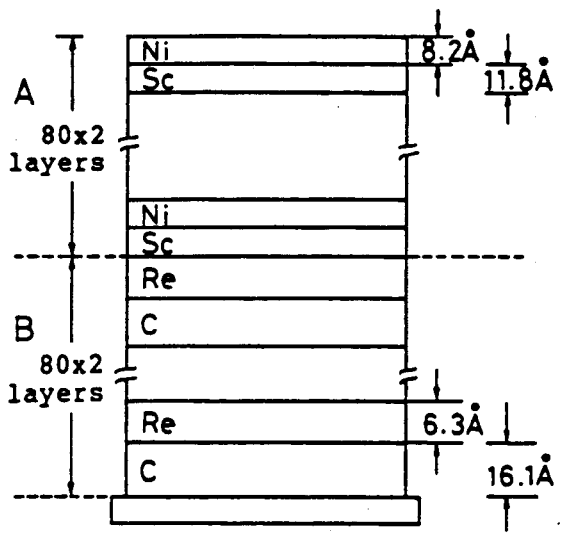
Figure 10:
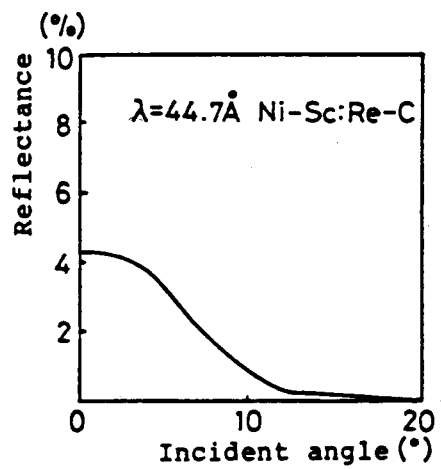
Figure 10:
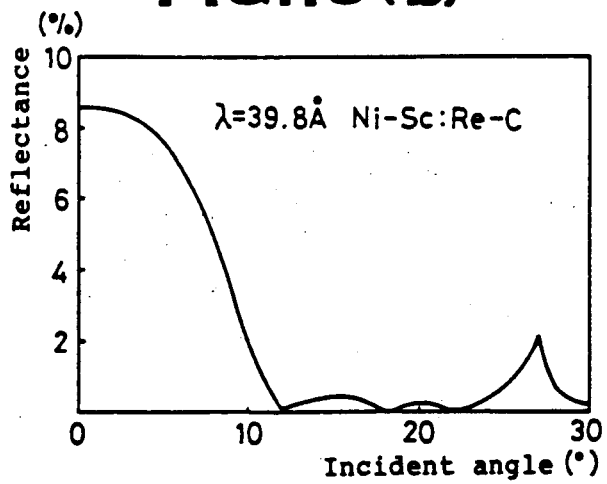

FIG. 10 shows a second example of the multilayer reflecting mirror. The multilayer reflecting mirror has high reflectances for the X rays of two wavelengths $\lambda_1=39.8$ Å and $\lambda_2=44.7$ Å for C detection which are vertically incident. As shown in FIG. 10(a), the multilayer reflecting mirror comprises part A in which 80 couples of an Ni layer having a thickness of 8.2 Å and an Sc layer having a thickness of 11.8 Å are laid on the side of the incident surface, and part B in which 80 couples of a C layer having a thickness of 16.1 Å and an Re layer having a thickness of 6.3 Å on the side of the substrate 3. FIGS. 10(b) and 10(c) shows the angle dependence of the reflectance of this multilayer for the X rays of wavelengths of 39.8 Å and 44.7 Å, respectively. The peak value of the reflectance is 8.3% for the X rays of $\lambda=39.8$ Å and 4.2% for the X rays of $\lambda=44.7$ Å. Also in this multilayer reflecting mirror, part A having a higher transmissivity is arranged on the side of the incident surface.

Figure 11:
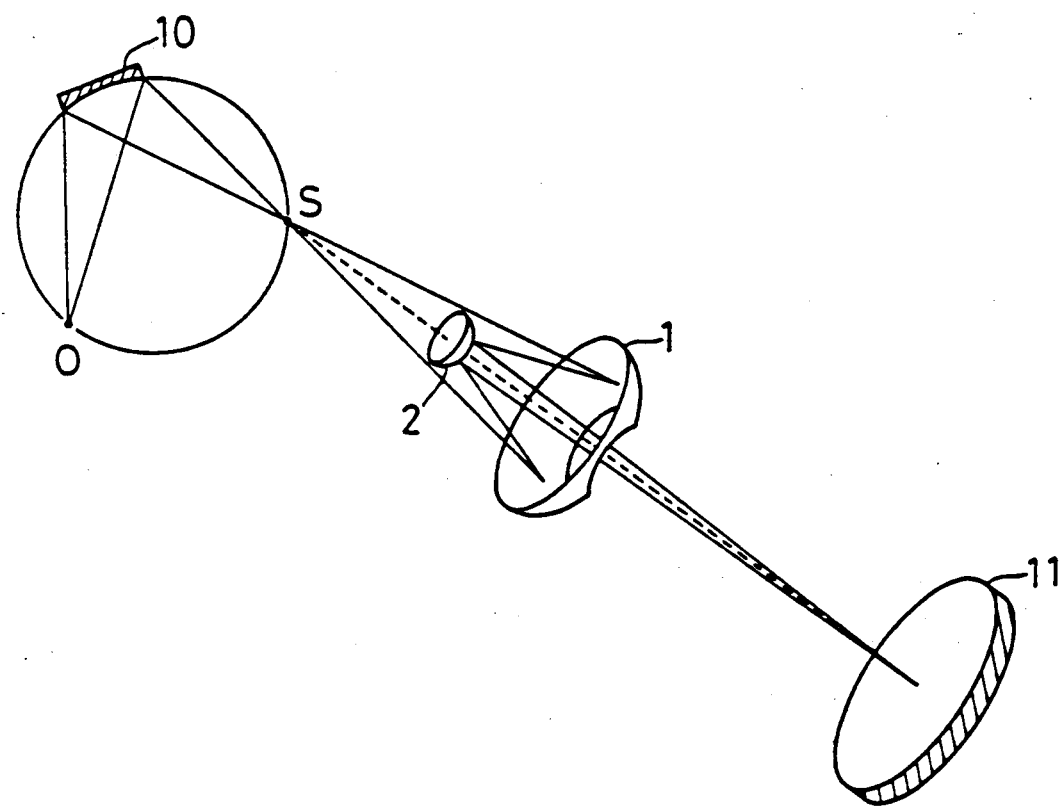
FIGS. 11 and 12 are illustrations showing two examples of methods of X-ray dispersion.

When such mutilayer reflecting mirrors are used as the mirror surfaces of Schwarzschild optical systems, transmission images for C and Ca can be obtained by two wavelengths shorter and longer than the absorption edges of C and Ca, respectively, to make difference images. In this example, however, it is not possible to take a transmission image by a specific wavelength by inserting a stop into the optical system as in Example 1. Therefore, as shown in FIG. 11, X rays from a white ray source O are dispersed by a dispersing device 10 such as a concave diffraction grating to select a specific wavelength of X rays, and a specimen S is illuminated by the selected X rays to obtain an enlarged transmission image by the Schwarzschild optical system. The dispersing device 10 may preferably be a monochromator of the Seya-Namioka type which need not change the positions of the ray source O and the specimen S.

Numeral 11 represents a detector such as a microchannel plate.

Figure 12:
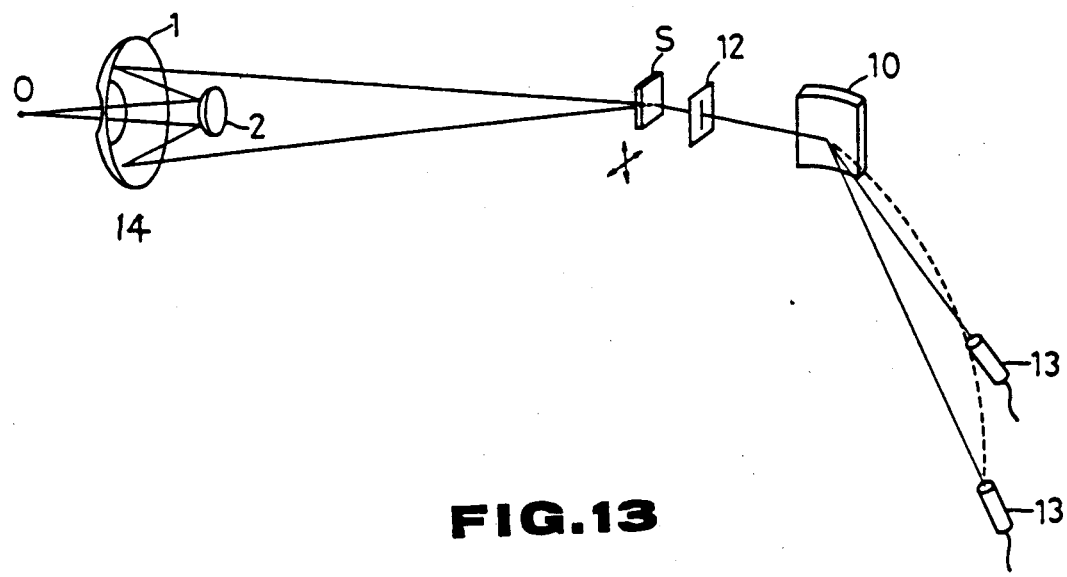

Further, as shown in FIG. 12, there is an X-ray microscope in which X rays from a ray source O are focused on a specimen S by a Schwarzschild optical system 14 and the specimen S or the focusing point of the X rays is moved in two directions perpendicular to each other as indicated by arrows to scan the surface of the specimen by the X rays. In this type of microscope, it is possible to arrange a dispersing device 10 just before detectors. FIG. 12 shows that the X rays passing through the specimen S are made parallel by a suitable slit 12 and dispersed by the dispersing device 10. When the X rays are dispersed by a diffraction grating such as a concave diffraction grating as in this case, the dispersed X rays are diffracted at different diffraction angles in accordance with their wavelengths. Therefore, when the positions of a plurality of detectors 13 such as photomultipliers are properly selected, signals of various wavelengths can be detected at the same time. For example, when the multilayer of FIG. 9(a) is formed on the mirror surface, X rays of wavelengths 39.8 Å and 31.6 Å can be simultaneously focused.

In this example, only two kinds of multilayers are laid. In principle, however, if three or more kinds of multilayers are laid, X rays of three or more wavelengths can be focused so that difference images of two or more elements can be made.

Figure 13:
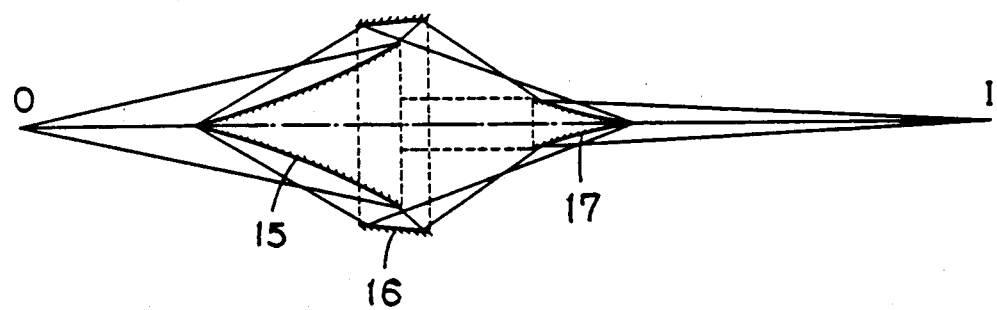
FIG. 13 is another embodiment of an optical system for X rays according to the present invention, which uses conical reflecting mirrors.

Although each of the above embodiments relates to a Schwarzschild optical system having two spherical reflecting mirrors, the present invention may naturally be applied for other optical systems for X rays. For example, FIG. 13 shows an optical system in which a quasi-conical reflecting mirror 15, a ring-shaped reflecting mirror 16 and a quasi-conical reflecting mirror 17 are coaxially arranged and X rays from a ray source O is focused at an image point I via the above reflecting mirrors. When the present invention is applied for the above reflecting mirrors, one can obtain an optical system for X rays having different wavelengths.

Among the materials used in the examples of the present invention, Re, Sc and Ni are metallic and C is non-metallic.

What is claimed is:

1. An X-ray optical system comprising at least two multilayer reflecting mirrors for focusing at a predetermined position X-rays radiated from a ray source, wherein each of said multilayer reflecting mirrors has a mirror surface for reflecting X-rays of different wavelengths, and the wavelengths of the X-rays reflected by one reflecting mirror are substantially the same as the wavelengths of the X-rays reflected by another reflecting mirror.

2. The X-ray optical system according to claim 1, wherein each of the mirror surfaces of said multilayer reflecting mirrors is divided into a plurality of regions, and the wavelength of the X-rays whose reflectance is maximum in one region is different from the wavelength of the X-rays whose reflectance is maximum in another region.

3. The X-ray optical system according to claim 2, wherein said reflecting mirrors are arranged in such a manner that the X-rays reflected by one region of said one multilayer reflecting mirror are incident on that region of said another multilayer reflecting mirror which has the maximum reflectance for the wavelength of said X-rays.

4. The X-ray optical system according to claim 2, wherein one of the regions of said multilayer reflecting mirror is provided with a multilayer having a maximum reflectance for X-rays of a wavelength longer than that of the absorption edge of a specific chemical element, and another region of said multilayer reflecting mirror is provided with a multilayer having a maximum reflectance for X-rays of a wavelength shorter than that of the absorption edge of the element.

5. The X-ray optical system according to claim 4, wherein the optical system comprises a stop for blocking the optical path of the optical system, and the size and/or shape of the opening of the stop is determined in such a manner that X-rays may be incident only on one of the regions of said multilayer reflecting mirror and may not be incident on another region.

6. The X-ray optical system according to claim 1, wherein each of said multilayer reflecting mirrors comprises a substrate and a plurality of multilayers laid on the substrate, and the wavelength of X-rays to be reflected with a maximum reflectance varies from multilayer to multilayer.

7. The X-ray optical system according to claim 6, wherein one of said multilayers has a maximum reflectance for X-rays of a wavelength longer than that of the absorption edge of a specific chemical element, and another multilayer has a maximum reflectance for X-rays of a wavelength shorter than that of the absorption edge of the element.

8. The X-ray optical system according to claim 6, wherein a multilayer remote from the substrate has a higher transmissivity of X-rays than a multilayer near the substrate.

9. The X-ray optical system according to claim 3, wherein the optical system is a Schwarzschild optical system comprising a concave multilayer reflecting mirror having an opening in its center, and a convex multilayer reflecting mirror opposed to the concave mirror.

10. The X-ray optical system according to claim 6, wherein the optical system is a Schwarzschild optical system comprising a concave multilayer reflecting mirror having an opening in its center, and a convex multilayer reflecting mirror opposed to the concave mirror.

11. The X-ray optical system according to claim 9, wherein each of the mirror surfaces of said concave multilayer reflecting mirror and said convex multilayer reflecting mirror is divided into a plurality of regions defined by at least one circle having its center of curvature on the optical axis of the Schwarzschild optical system, and the Schwarzschild optical system is provided on its optical axis with a stop for shading all but one region of each of said mirrors.

12. The X-ray optical system according to claim 9, wherein each of the mirror surfaces of said concave multilayer reflecting mirror and said convex multilayer reflecting mirror is divided into a plurality of fan-shaped regions defined by at least one line intersecting the optical axis of the Schwarzschild optical system, and the Schwarzschild optical system is provided on its optical axis with a stop for shading all but one region of each of said mirrors.

13. The X-ray optical system according to claim 7, wherein a multilayer remote from the substrate has a higher transmissivity of X-rays than a multilayer near the substrate.

14. An X-ray microscope comprising:
a ray source for radiating X-rays;

an X-ray focusing optical system comprising at least two multilayer reflecting mirrors, wherein each of said multilayer reflecting mirrors has a mirror surface for reflecting X-rays of different wavelengths, and the wavelengths of the X-rays reflected by one reflecting mirror are substantially the same as the wavelengths of the X-rays reflected by another reflecting mirror;

a detector for receiving the X-rays from the X-ray focusing optical system; and

X-ray dispersing means arranged between said ray source and said X-ray focusing optical system for selectively causing the X-rays of a wavelength capable of being reflected by said multilayer reflecting mirrors to enter said X-ray focusing optical system.

15. An X-ray microscope comprising:

a ray source for radiating X-rays;

an X-ray focusing optical system comprising at least two multilayer reflecting mirrors, wherein each of said multilayer reflecting mirrors has a mirror surface for reflecting X-rays of different wavelengths, and the wavelengths of the X-rays reflected by one reflecting mirror are substantially the same as the wavelengths of the X-rays reflected by another reflecting mirror;

a detector for receiving the X-rays from the X-ray focusing optical system; and

X-ray dispersing means arranged between said X-ray focusing optical system and said detector for selectively causing one of the X-rays coming from said X-ray focusing optical system to enter said detector.

16. The X-ray microscope according to claim 14, wherein said X-ray dispersing means is a diffraction grating.

17. The X-ray microscope according to claim 15, wherein said X-ray dispersing means is a diffraction grating.

* * * * *